US012726817B2

(12) United States Patent
Chauhdary et al.

(10) Patent No.: US 12,726,817 B2
(45) Date of Patent: Sep. 1, 2026

(54) USER DEVICE AUTHENTICATION METHODS USING PHYSICAL UNCLONABLE FUNCTION FOR CELLULAR COMMUNICATIONS

(71) Applicant: UNIVERSITY OF JEDDAH, Jeddah (SA)

(72) Inventors: Sajjad Hussain Chauhdary, Jeddah (SA); Sajid Saleem Chauhdary, Jeddah (SA); Mohammed A. Alqarni, Jeddah (SA); Mohammed S. Alkatheiri, Jeddah (SA)

(73) Assignee: UNIVERSITY OF JEDDAH, Jeddah (SA)

( * ) Notice: Subject to any disclaimer, the term of this patent is extended or adjusted under 35 U.S.C. 154(b) by 0 days.

(21) Appl. No.: 19/055,952

(22) Filed: Feb. 18, 2025

(65) Prior Publication Data

US 2026/0247144 A1 Aug. 20, 2026

(51) Int. Cl.
*H04W 12/06* (2021.01)
*H04L 9/32* (2006.01)
*H04W 12/71* (2021.01)
*H04W 60/04* (2009.01)

(52) U.S. Cl.
CPC ........... *H04W 12/06* (2013.01); *H04L 9/3278* (2013.01); *H04W 12/71* (2021.01); *H04W 60/04* (2013.01)

(58) Field of Classification Search
CPC ..... H04W 12/06; H04W 12/71; H04W 60/04; H04W 12/08; H04L 9/3278
See application file for complete search history.

(56) References Cited

U.S. PATENT DOCUMENTS

| | | | | |
|---|---|---|---|---|
| 10,708,780 | B2 | 7/2020 | Mudulodu et al. | |
| 12,149,642 | B2 * | 11/2024 | Luo | H04L 9/0866 |
| 12,301,563 | B2 * | 5/2025 | Kumar | H04W 12/069 |
| 12,585,833 | B2 * | 3/2026 | Bean | G06F 21/73 |
| 12,598,075 | B2 * | 4/2026 | Kornegay | H04L 9/3236 |
| 2019/0165957 | A1 * | 5/2019 | Abbott | G06F 21/44 |
| 2019/0238348 | A1 * | 8/2019 | Cambou | H04L 9/3278 |
| 2020/0412556 | A1 * | 12/2020 | Yoon | H04L 63/0876 |
| 2022/0029836 | A1 * | 1/2022 | Qureshi | H04L 9/0643 |
| 2022/0029994 | A1 * | 1/2022 | Choyi | H04L 63/0892 |
| 2023/0020947 | A1 * | 1/2023 | Luo | H04L 9/0643 |
| 2024/0250824 | A1 * | 7/2024 | Kornegay | H04L 9/3236 |

(Continued)

FOREIGN PATENT DOCUMENTS

| | | | | |
|---|---|---|---|---|
| CN | 105978694 B | | 9/2016 | |
| CN | 117439740 A | * | 1/2024 | H04L 9/3278 |

(Continued)

*Primary Examiner* — Khawar Iqbal
(74) *Attorney, Agent, or Firm* — PATENT PORTFOLIO BUILDERS PLLC

(57) ABSTRACT

A user authentication method performed by a user equipment, UE, in a cellular network includes transmitting to a serving node an attachment request including a user identifier, receiving, form the serving node, SN, an authentication request indicating a physical unclonable function, PUF, challenge, a first random number, and a serving node identifier of the SN, measuring a PUF response as a result of applying the PUF challenge to a universal subscriber identity module, USIM, of the UE, and selectively transmitting an authentication response including the measured PUF response.

16 Claims, 8 Drawing Sheets

(56) References Cited

U.S. PATENT DOCUMENTS

| | | | | |
|---|---|---|---|---|
| 2024/0322996 | A1 * | 9/2024 | Kumar | H04L 9/3242 |
| 2024/0323033 | A1 * | 9/2024 | Kumar | H04L 9/3247 |

FOREIGN PATENT DOCUMENTS

| | | | | | |
|---|---|---|---|---|---|
| CN | 119182536 | A | * | 12/2024 | H04W 12/08 |
| WO | 2017189590 | A1 | | 11/2017 | |
| WO | WO-2022090813 | A1 | * | 5/2022 | H04W 12/06 |
| WO | WO-2025032092 | A1 | * | 2/2025 | H04L 69/24 |

* cited by examiner

USER DEVICE AUTHENTICATION METHODS USING PHYSICAL UNCLONABLE FUNCTION FOR CELLULAR COMMUNICATIONS

BACKGROUND OF THE INVENTION

Technical Field

Embodiments of the subject matter disclosed in this document generally relate to methods and devices operating in cellular communication systems such as (but not limited to) the ones described in 3rd Generation Partnership Project (3GPP) technical specifications, for example, the Long Term Evolution (LTE), Fifth Generation (5G), or future 6G systems. More particularly, these embodiments perform user authentication using physical unclonable functions (PUFs).

Discussion of the Background

Cellular network technologies have advanced over several generations, including 2G, 3G, 4G, and 5G, and are standardized by 3GPP. Authentication, which refers to the process of verifying the identity of a mobile device trying to access the network, is typically based on a unique cryptographic key stored in a Subscriber Identity Module (SIM). Note that the term "mobile" here does not require the device to actually move but indicates that it can receive network services regardless of its actual location (that may change without service interruption as long as the mobile device remains in a serviced area). The unique cryptographic key allows the network (i.e., network core and base stations managing different cells) to verify whether the mobile device is legitimate and authorized to use the network services, preventing unauthorized access and fraudulent activity. Authentication often involves a "challenge-response" mechanism known as Authentication and Key Agreement (AKA), during which the network sends a random challenge to the mobile device, which then responds to using its unique cryptographic key to prove its identity to the network. A central database operated by the network (e.g., the Home Subscriber Server (HSS) in LTE or the Unified Data Management (UMD) that works with the User Data Repository (UDR) in 5G) stores the user's authentication information and encryption keys.

Authentication and key management are fundamental to the security in networks because they provide mutual authentication between users and the core network and derive cryptographic keys to protect both the network and the users. The keys being compromised is a serious security issue potentially leading to identity theft, communication interception, denial of services or service downgrading, and location tracking. The authentication methods have evolved and improved from one generation of cellular standards to the next. For example, 4G networks have used 4G Evolved Packet System Authentication and Key Agreement (EPS-AKA), while 5G network are using (i) 5G-AKA, (ii) Extensible Authentication Protocol (EAP) Authentication and Key Agreement (EAP-AKA), and (iii) EAP Transport Layer Security (TLS). However, in parallel to the more and more complex authentication methods, user identity attackers have developed new techniques to infiltrate between the user and the network, substituting the user or stealing user information. Therefore, there is an ongoing need to develop user authentication methods and associated device that are less prone to such attacks.

SUMMARY OF THE INVENTION

According to an embodiment, there is a user authentication method performed by a UE in a cellular network, and the method includes transmitting to a serving node an attachment request including a user identifier, receiving, form the serving node, SN, an authentication request indicating a physical unclonable function, PUF, challenge, a first random number, and a serving node identifier of the SN, measuring a PUF response as a result of applying the PUF challenge to a universal subscriber identity module, USIM, of the UE, and selectively transmitting an authentication response including the measured PUF response.

According to another embodiment, there is an authentication method performed by a serving node in a cellular network, and the method includes forwarding an attachment request including a user identifier, ID, to a core network device, selectively transmitting, to a user equipment, UE, associated with the user ID, an authentication request indicating a physical unclonable function, PUF, challenge received from the core network device in response to the attachment request, a first random number generated by the serving node, and a serving node identifier of the serving node. The method may further include verifying that a PUF response associated with an authentication response received from the UE corresponds to the transmitted PUF challenge.

According to yet another embodiment, there is a user device configured to operate in a cellular network, and the user device includes a communication interface configured to exchange wireless communications with a serving node in the cellular network, a physical unclonable function, PUF, configured to output unique PUF responses in response to applied PUF challenges, respectively, and a processor configured to control the communication interface and the PUF to transmit an attachment request including a user identifier, to receive an authentication request indicating a specific PUF challenge, a first random number, and a serving node identifier, and to selectively transmit an authentication response, including a PUF response to the specific PUF challenge.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the embodiments refers to the accompanying drawings. The same or similar reference numbers in different drawings identify the same or similar elements. The following detailed description does not limit the invention. Instead, the scope of the invention is defined by the appended claims. The following embodiments are discussed, for simplicity, with regard to cellular communications but may be applied to other types of communication systems.

According to some embodiments, authentication methods in a cellular network employ a physical unclonable function (PUF) which generates unique distinctive, and unpredictable identifiers/responses linked to the hardware of the user device. Because the response of the PUF function to a certain input (challenge) is unique to the PUF device, such response is used in the following embodiments for authenticating the PUF device to the network.

Before discussing the PUF embodiments, a couple of drawbacks of the currently used approaches to user authentication are discussed. User identity is a key component to be protected in cellular network technologies. The SIM (such as removable user identity module (R-UIM) and the Universal SIM (USIM)) are used in all existing generations of cellular networks. The USIM is an integrated circuit or software module that stores an International Mobile Subscriber Identity (IMSI). The USIM stores a user's subscription and authentication information for accessing cellular networks. It is an evolution of the SIM (Subscriber Identity Module) card, tailored to meet the needs of newer-generation networks, including 5G. The USIM facilitates mutual authentication between the user and the network using robust cryptographic methods, ensuring secure access to the 5G network. It supports enhanced encryption and integrity protection required by 5G for privacy and data security. The USIM may stores essential information, such as the IMSI and authentication keys, used to uniquely identify and authenticate a subscriber. The USIM can exist as a physical card (e.g., a nano-SIM) or as an embedded SIM (eSIM) that is remotely programmable. The USIM supports features like Subscription Permanent Identifier (SUPI) and Subscription Concealed Identifier (SUCI), which anonymize the subscriber's identity to prevent tracking or unauthorized access.

The IMSI or a Globally Unique Temporary Identity (GUTI), which the network may assign to a device connecting to the cellular network to protect the IMSI, are used to identify and authenticate a subscriber device (such as a mobile phone or a tablet). Note that the USIM Cloneable authentication features are a weakness of authentication with identifiers stored in SIMs. This weakness is a threat to user privacy and lead to information leakage.

Figure 1:
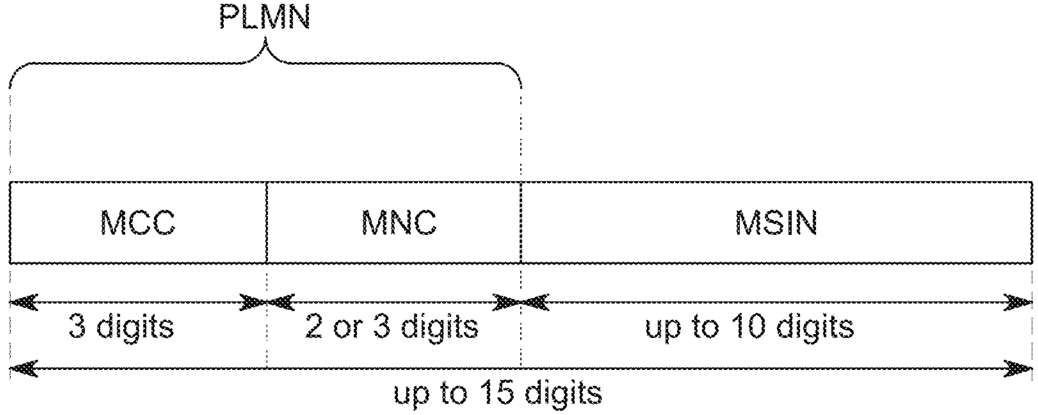
FIG. 1 illustrates a structure of an International Mobile Subscriber Identity (IMSI)

The IMSI (or the GUTI replacing it) includes identity information about the country, the network operator, and the subscriber. For example, as illustrated in FIG. 1, an IMSI typically includes 3 digits for the mobile country code (MCC), 2 or 3 digits for the mobile network code (MNC), and up to 10 digits for a mobile subscriber identification number. For example, the MMC is 420 for Saudi Arabia, the MNC is 01 for Saudi Telecom Company in Saudi Arabia, and the MSIN may be "0123456789". The MCC and the MNC form a public land mobile network identifier (PLMN ID) that globally identifies a mobile operator.

Figure 2:
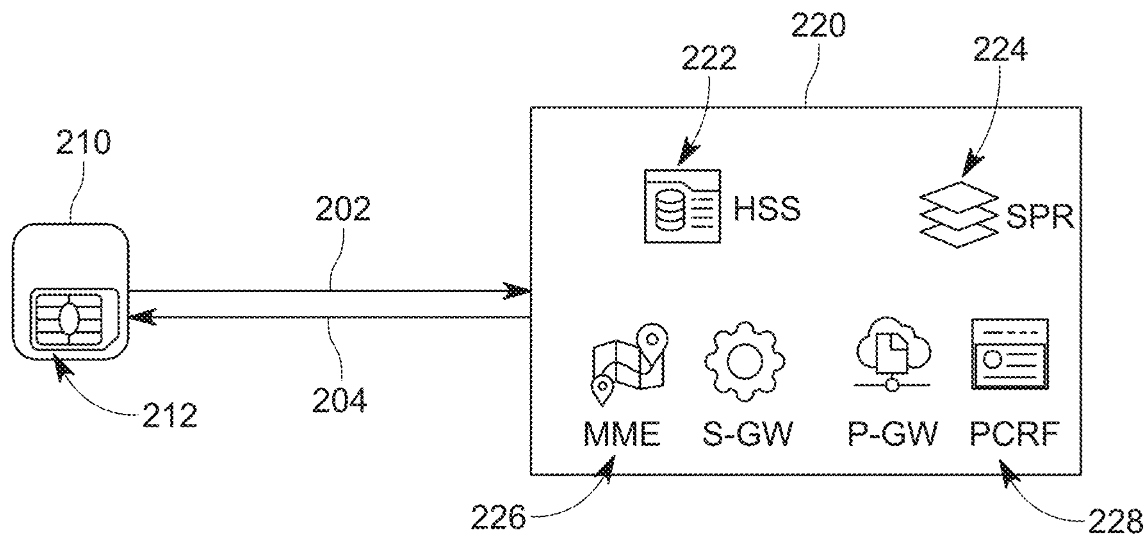
FIG. 2 is a diagram illustrating a conventional use of the IMSI to authenticate a user device.

FIG. 2 illustrates a conventional use of the IMSI to authenticate a user device 210 in an LTE cellular network 220. Similar techniques are employed in other generations of cellular networks (e.g., 5G). The user device 210 with the USIM 212 sends 202 an attach request including the IMSI, to a cellular network core 220 via a base station (not shown). The cellular network core 220 includes plural functional modules (only few modules being illustrated in FIG. 2) running on one or more physical devices. The home subscriber server (HSS) 222 is a repository storing subscriber profile and state information. The subscriber profile repository (SPR) 224 stores subscriber-specific information related to control data policy and charging control (e.g., allowed services, permitted quality of service (QoS) levels, and charging rules for each user within the network). The mobility management entity (MME) 226 handles security, connectivity, mobility, and inter-networking. Gateways (i.e., serving gateway (S-GW) and packet data network gateway (P-GW)) enable connection of a mobile device (such as 210) with an external packet data network, such as the internet. The policy and charging rules function (PCRF) 228 manages real-time subscriber data flow and charge (e.g., the amount of data a user can consume, the Quality of Service (QoS), and cost based on predefined rules and subscriber information).

For a registered subscriber (valid IMSI), the HSS 222 stores a key to be used along with the IMSI for authenticating the subscriber (i.e., user device 210 with USIM card 212 storing the IMSI sent with the attach request at 202), and a corresponding QoS profile. The HSS 222 rejects an attach request with an unregistered IMSI but allows ones with a valid registered IMSI by delivering authentication information and QoS profile to the MME 226. The MME 226 then continues the user authentication by sending 204 an encrypted key challenge to the mobile device 210. If the mobile device 210 replies with an appropriate response to the encrypted key challenge, then the user device is authenticated. The MME and the user device may use paired keys to encrypt and decrypt the challenge and the response.

Figure 3:
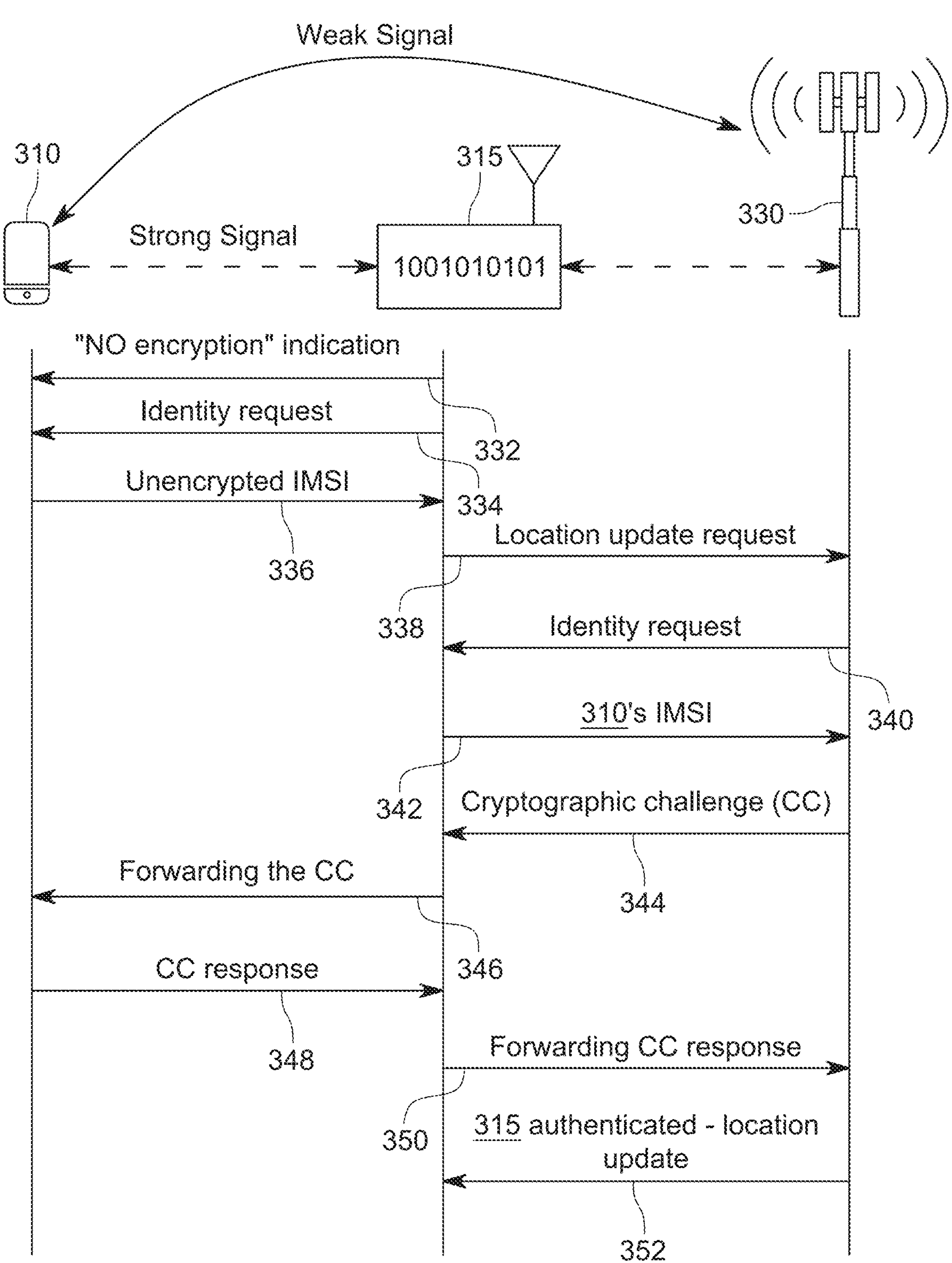
FIG. 3 is a setup illustrating an IMSI catcher device operation.

An identity attack performed by an IMSI catcher device 315 is illustrated in FIG. 3. Since the mobile device 310 detects a stronger signal from the IMSI catcher device 315 than from the base station 330, the mobile device 310 attempts to negotiate a connection with the IMSI catcher device 315. The IMSI catcher device 315, which pretends to be a legitimate base station, sends 332 a "no encryption" indication to the mobile device 310. Further, the IMSI catcher device 315 sends 334 an identity request to the mobile device 310. The mobile device 310 responds 336 with its unencrypted IMSI to the identity request.

The IMSI catcher device 315, pretending to be a mobile device, then sends 338 a location update request to the base station 330 (which is located on or connected to a cellular network tower as represented in FIG. 3). A mobile device in an LTE network typically sends such a location update request (e.g., a "Tracking Update Area" message) periodically or when moving to a new tracking area (e.g., a new cell). The location update enables the network to efficiently direct the data flow to the mobile device (e.g., via a new base station when the mobile device is in a new cell).

Upon receiving the location update request, the base station 330 transmits 340 an identity request (similar to the identity request 334) to which the IMSI catcher device 315 responds 342 with the IMSI (stolen in steps 332-336) of the mobile device 310. The base station 330 then sends 344 a cryptographic challenge that requires an encryption key K1 stored in the mobile device 310's USIM to decrypt. The IMSI catcher device 315 forwards 346 the cryptographic challenge to the mobile device 310, again pretending to be a legitimate base station. The mobile device 310 decrypts the cryptographic challenge using the encryption key K1 stored in its USIM, and provides 348 the appropriate response to the cryptographic challenge to the IMSI catcher device 315. The IMS catcher device 315 then forwards 350 the response to the cryptographic challenge to the base station 330. The base station then authenticates the IMSI catcher 315 by replying 352 to the location update request. The IMSI catcher 315 may then, for example, use network services that are charged to the mobile device 310. Other more sophisticated attacks can be launched once the mobile device 310's IMSI is compromised. Most of the time the IMSI is intercepted during the connection procedure after a handover.

When mobile devices started to employ techniques to avoid the strongest signal base station decoy illustrated in FIG. 3, the attackers developed more subtle persuasive means to deceive a mobile user to connect to an IMSI catcher device.

Communication interception between a mobile phone and a legitimate base station associated with a cell tower has been possible in 2G networks (also known as global systems for mobile communications (GSM)) but not in later 3G or 4G networks because (i) communicating over GSM does not always require encryption, and (ii) even when encryption was enabled, the cryptographic algorithms used in GSM could be decrypted.

An IMSI catcher device may in principle launch an active attack on 2G (GSM) networks by intercepting a user device's communications with its serving base station. Since in this case, the IMSI catcher device places itself between the user's device and the base station, this type of attack is called a "man or machine in the middle" (MitM) attack. The MitM attack consists of two steps: (i) spoofing authentication, and (ii) disabling or breaking the encryption. Steps 338-350 in FIG. 3 constitute a spoofing authentication as the IMSI catcher device 315 deceives the base station that it is the mobile device.

In some embodiments, a physical unclonable function (PUF) is selected to be (or to be associated with) the USIMs because of PUF's ability to generate unique identities or cryptographic keys dependent on physical characteristics of the hardware. A PUF is associated with a physical object (typically a chip or a memory, in this embodiment, the USIM module) that produces a unique "digital fingerprint" output for a given input and ambient conditions. For example, a PUF of a dynamic random access memory (DRAM) works by estimating the states of DRAM cells that are 0 and 1 after a given time. The DRAM cell is 1 when charged and 0 when discharged. A charged cell discharges in time. The number of charged DRAM cells in a DRAM memory that discharged after a given time is unique to that DRAM memory. This feature may be exploited by the PUF. A challenge for this specific case is the original binary value asserted to an array of DRAM cells, and the response is the value of the array after the given time interval. Note that the DRAM cells perform periodic refresh commands. When the PUF is implemented, this mechanism is suspended for the given time interval. Other chips or memories may use different parameters (instead of the status of the memory cell) for supporting the PUF. When prompted, PUFs generate keys based on random physical factors that are unpredictable and uncontrollable, making them virtually impossible to duplicate. The embodiments provide techniques to use PUF for authenticating a legitimate mobile device in a cellular network preventing identity cloning (which is achieved by the IMSI catcher in FIG. 3).

The proposed protocol for secure operation of a network device (sometimes also called user equipment (UE)) and a cellular network consists of two phases: (1) an initiation of authentication or preliminary registration phase, and (2), an authentication phase. A secure session is generated after mutual authentication between the mobile device/UE and the cellular network core via a serving node (SN).

A UE ($UE_i$) operating based on a PUF responds to a unique challenge ($C_i^{(0)}$) with a unique response ($R_i^{(0)}$) based on its physical characteristics. Due to the random variations in manufacturing, it is practically impossible to create an identical copy of a PUF. For example, silicon PUFs use variation of transistors within an integrated circuit to generate unique responses. Common types of PUFs include static random-access memory (SRAM) PUF (which leverages the inherent variations in individual SRAM cells), delay-based PUFs (which leverages the difference in signal propagation delays between different circuit paths), ring oscillator PUF (which leverages delay differences of a pair or a group of ring oscillators), and glitch PUF (which leverages characteristics—like timing or shape—of intentionally introduced control glitches). PUFs are produced asymmetrically and basically impossible to produce a copy or a clone. A challenge cannot be reused after an answer has been received. The network authenticates a UE/USIM based on a challenge-response mechanism.

During the preliminary registration, the mobile device or $UE_i$ ("i" is the number of users in the network) gets registered with the cellular network based on its IMSI from USIM. The UE; is assigned a temporary identifier, such as a temporary mobile subscriber identity (TMSI) or a subscription concealed identifier (SUCI), which might be refreshed after every secure session. The TMSI in LTE is a unique number assigned to a mobile subscriber by the MME to maintain the subscriber's confidentiality. In 5G, the TMSI is a randomly assigned number generated by the access and mobility management function (AMF) that acts as a temporary identity between a mobile device and a cellular network. The SUCI is a unique identifier generated by encrypting the subscription permanent identifier (e.g., IMSI). This temporary identity may be refreshed after each session. In contrast, the cellular network serving node has a permanent identity $SN_{id}$.

When a chip or memory or another part of the UE is selected to support the PUF, the manufacturer of the device or the network operator of the device applies various PUF challenges $C_i^{(0)}$, where the superscript indicates the challenge count and the subindex indicates the corresponding UE in a controlled environment, and records corresponding responses $R_i^{(0)}$ generated by the UEs. In one embodiment, the selected part of the UE is the USIM. In other words, for the following embodiments, the challenges $C_i^{(0)}$ were applied to the physical module supporting the USIM and the generated responses $R_i^{(0)}$ are for the same physical module. Note that other physical modules in the UE may be selected. The PUF responses $R_i^{(0)}$ are stored in a central database (such as HSS/SPR in LTE or UDM/UDR in 5G). In one embodiment, the PUF responses $R_i^{(0)}$ may also be stored in the UE to enable eliminating responses already used thereby preventing attacks. However, for security reasons, it is preferred that the PUF responses $R_i^{(0)}$ are only stored in a central database, such as HSS/SPR at the network side, not at the user. This preliminary registration phase occurs only once for the $UE_i$, before being supplied to the user. In other words, when the user buys the UE from the cellular network provider or other providers, the UE PUF responses have already been generated and recorded with the provider.

Figure 4:
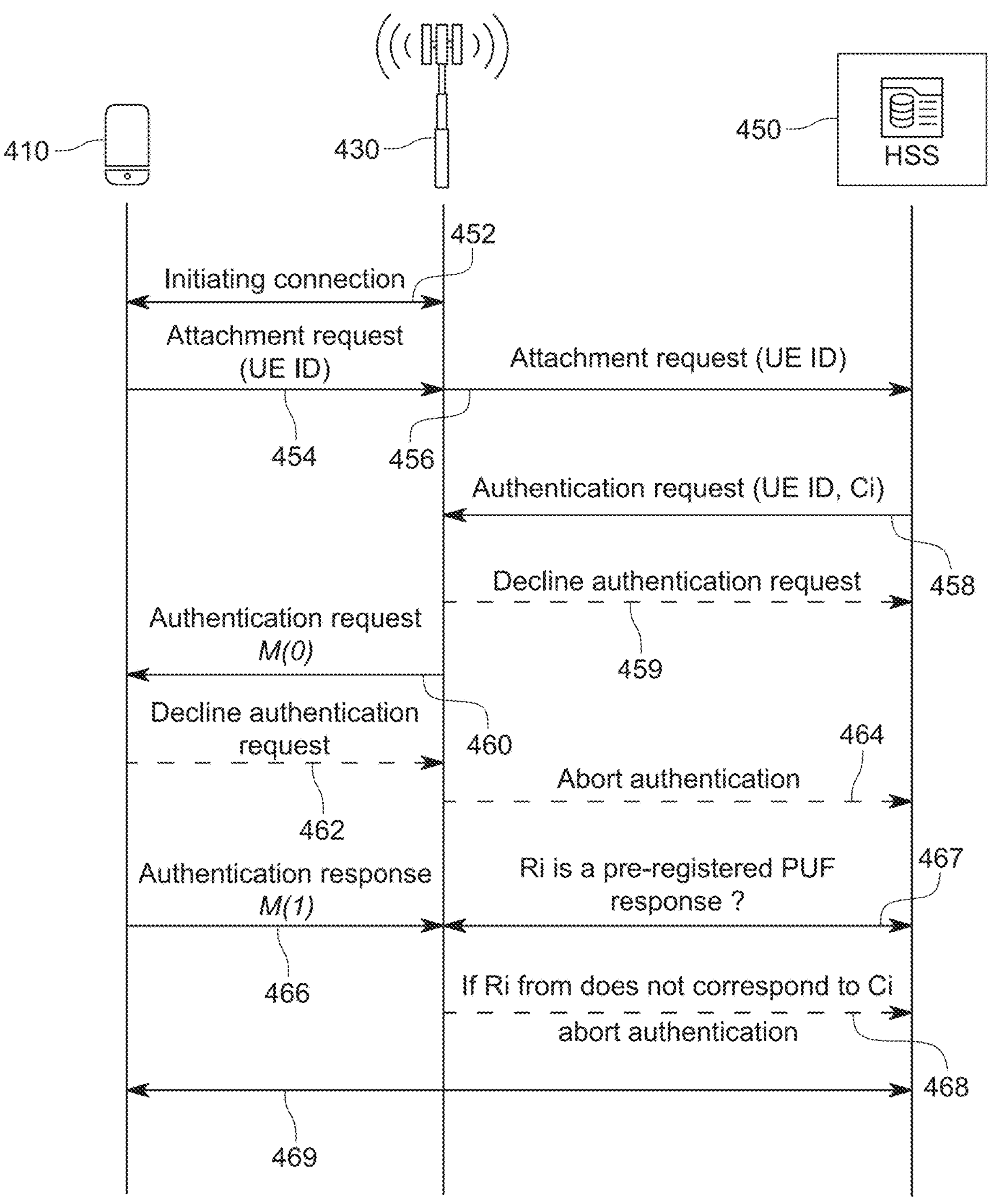
FIG. 4 is a signal diagram illustrating an authentication phase according to an embodiment.

FIG. 4 is a signal diagram illustrating an authentication phase according to an embodiment. The UE 410 initiates 452 a connection with a base station/serving node (SN) 430 (e.g., a random access procedure or a location request). The radio resource control (RRC) layer of the cellular network decides whether to establish a connection with the UE 410. The UE 410 then sends 454 an attachment request including a UE identifier (UE ID) to the SN 430. In an LTE network, the UE ID may be UE's IMSI (if the UE has not yet been assigned a temporary identifier), TMSI or global unique temporary identity (GUTI). In a 5G network, the UE ID may be UE's 5G-GUTI (if the UE has not yet been assigned a temporary identifier) or SUCI. The SN 430 forwards 456 the attachment request to the core network device 450. In the LTE network, the relevant modules of the core network represented by core network device 450 includes the MME and HSS. In the 5G network, the relevant modules of the core network represented by core network device 450 includes the AMF and the UMD. Steps 452-456 correspond to an embodiment describing an attachment procedure, which precedes the authentication phase.

The authentication starts with the core network device 450 sending 458, to the SN 430, an authentication request including the UE ID and a PUF challenge $C_i^{(0)}$ of the UE 410. The PUF challenge $C_i^{(0)}$ is retrieved from the central database (e.g., HSS or UMD) based on the UE identifier. Note that the PUF challenge $C_i^{(0)}$ is removed in one embodiment from the central database, i.e., a challenge is used only one time. When the UE ID in the authentication request does not match a UE ID that the SN 430 sent to the core network device 450 in an attachment request (that is, the attachment request was sent by an attacker), the SN 430 responds 459 by declining the authentication request thereby putting the core network on notice about the attack. The steps illustrated using dashed lines in FIG. 4 correspond to undesirable scenarios, while the steps illustrated using continuous lines follow a successful authentication scenario.

When the UE ID in the authentication request matches the UE ID that the SN 430 sent 456 to the core network device 450 in the attachment request, the SN 430 generates and transmits 460 an authentication request M(0) to the UE 410, the authentication request including a result of a hash function H applied to (1) a randomly generated nonce $SN_i^o(0)$, at the SN 430, (2) the $SN_{id}$ of the SN 430, and (3) the PUF challenge $C_i^{(0)}$. A hash function is a mathematical function that converts digital data into a string of a predetermined fixed length. Note that in this embodiment multiple verification processes are happening simultaneously, for example, checking different aspects of a user's identity at the same time, rather than sequentially, one after the other, to speed up the authentication process and potentially enhance security by cross-checking information across various sources.

Upon receiving the request M(0), the UE verifies that: (a) the UE ID (e.g., IMSI) and the $SN_{id}$ (this step happens due to the initial request for the attachment), (b) the nonce $SN_i^o(0)$ is a number never exchanged previously with the SN 430 (identified by the $SN_{id}$), and (c) that the received challenge $C_i^{(0)}$ has not been previously used. If any of the prongs (a), (b) and (c) fails, the UE 410 declines 462 the authentication request and the SN 430 notifies 464 the core network device 450 about aborting the authentication phase.

When all the above conditions are met, the UE 410 sends 466 an authentication response M(1) to the SN 430. The authentication response M(1) includes (1) a result of the hash function H applied to a randomly generated nonce $SN_i^o(1)$, at the UE 410, the $SN_{id}$ of the SN 430, and the received challenge $C_i^{(0)}$, and (2) the PUF response $R_i^{(0)}$ to the challenge $C_i^{(0)}$. Note that in one embodiment, the PUF response $R_i^{(0)}$ to the challenge $C_i^{(0)}$ is measured by the UE 410 based on the received challenge $C_i^{(0)}$. By measuring the response at the UE 410 based on the received challenge, a unique response is generated, which cannot be generated by any other device. Thus, as long as the user is in possession of the UE, no attacker can simulate the response to a specific challenge for the given UE.

Upon receiving the authentication response M(1), the SN 430 verifies 467 (d) that the $SN_{id}$ is indeed its identifier, (e) the $SN_i^o(1)$ is a number never exchanged previously with the UE 410 (identified by the $UE_i$), and (f) that $R_i^{(0)}$ corresponds to the challenge $C_i^{(0)}$. As previously discussed, during the preliminary registration, the cellular provider (which owns the SN 430 and the core network device 450) has generated all the responses for the various challenges associated with the UE 410. Thus, the SN 430 or the core network device 450 knows what response is expected for the challenge transmitted to the UE 410. Alternatively, or additionally, the core network device 450 verifies (f). If one of the conditions is not met, the SN 430 aborts 468 the authentication and informs the core network device 450 about this. When all the conditions (d) to (f) are met, the UE 410 is successfully authorized and uses 469 the network services according to the user subscription.

In one embodiment, the UE stores the registered PUF responses and verifies whether the PUF response generated by the PUF device in response to the received challenge is among the registered PUF responses. Further, the UE may remove the PUF response generated by the PUF device in response to the received challenge from the stored registered PUF responses. This additional verification provides an additional safeguard against catcher device attacks that would reuse an intercepted challenge.

Figure 5:
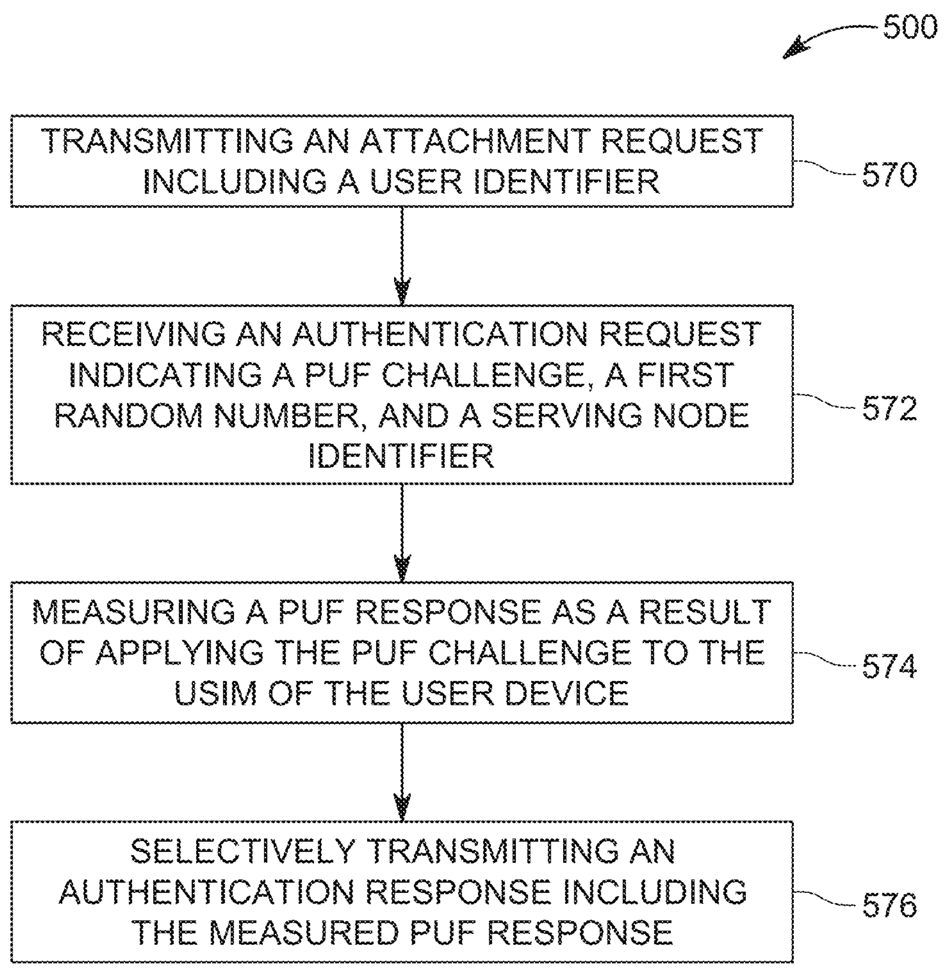
FIG. 5 is a flowchart of a method performed by a user device in a cellular network according to an embodiment.

FIG. 5 is a flowchart of an authentication method 500 based on PUF responses, performed by a user device (e.g., UE 410 in FIG. 4) in a cellular network according to an embodiment. The method 500 includes transmitting 570 an attachment request including a user identifier (e.g., 454 in FIG. 4), and receiving 572 an authentication request indicating a PUF challenge, a first random number, and a serving node identifier (e.g., 460 in FIG. 4). The method 500 further includes measuring 574 the PUF response as a result of applying the PUF challenge to the USIM of the UE and then selectively transmitting 576 an authentication response including the measured PUF response (e.g., 466).

The UE transmits the attachment request to an SN and receives the authentication response from the SN. Step 576 may include verifying that the first random number has not been previously exchanged with the serving node, otherwise the UE declining the authentication request. Step 576 may further include verifying that a received user identifier indicated via the authentication request corresponds to the user identifier included in the attachment request, otherwise the UE declining the authentication request.

In some embodiments, the authentication request includes a result of a hash function applied to the PUF challenge, the first random number, and the serving node identifier. Similarly, the authentication response may include a result of a hash function applied to the PUF response, a second random number, and the serving node identifier. The user identifier may be a temporary identifier (such as a TMSI or a SUCI).

The method 500 may further include registering, with the cellular network, a set of PUF challenges and a set of PUF responses generated by a PUF of the IMSI of the user device in response to the set of PUF challenges, the set of PUF responses and the selectively transmitting the authentication response includes verifying that the PUF challenge indicated in the authentication request is included in the set of PUF responses.

Figure 6:
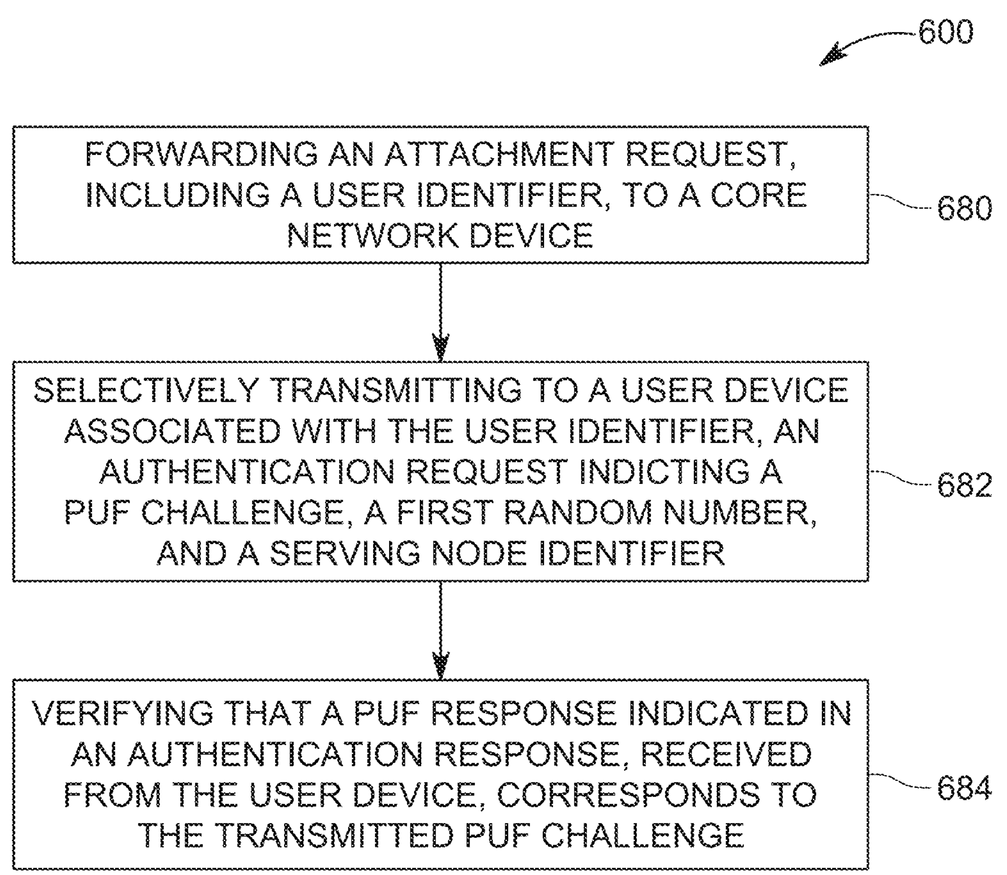
FIG. 6 is a flowchart of a method performed by a serving node in a cellular network according to an embodiment.

FIG. 6 is a flowchart of an authentication method 600 using PUF responses performed by a serving node in a cellular network according to an embodiment. The method 600 includes forwarding 680 an attachment request including a user device identifier to a core network device. The method 600 further includes selectively transmitting 682 an authentication request to a user device associated with the user identifier. The authentication request indicates (i) a physical unclonable function, PUF, challenge received from the core network device in response to the attachment request, (ii) a first random number, and (iii) a serving node identifier of the serving node. The method 600 also includes verifying 684 that a PUF response associated with an authentication response received (e.g., 466) from the user device corresponds to the PUF challenge stored by the serving node or core network device.

The step 682 may include verifying that a returned user identifier received with the PUF challenge matches the user ID. The step 684 may include transmitting the PUF response to the core network device (as in step 467 in FIG. 4). Then, in response to transmitting the PUF response, the UE receives an indication that the PUF response is included in a set of pre-registered PUF responses associated with the user device.

The method 600 may further include sending to the core network device an indication that the user device is not authenticated when the verifying determines that PUF response indicated in the authentication response received (e.g., at 466) from the user device does not correspond to the PUF challenge.

As above, the authentication request includes a result of applying a hash function to the PUF challenge, the first random number, and the serving node identifier, and the authentication response may include a result of applying the hash function to the PUF response, a second random number, and the serving node identifier.

Figure 7:
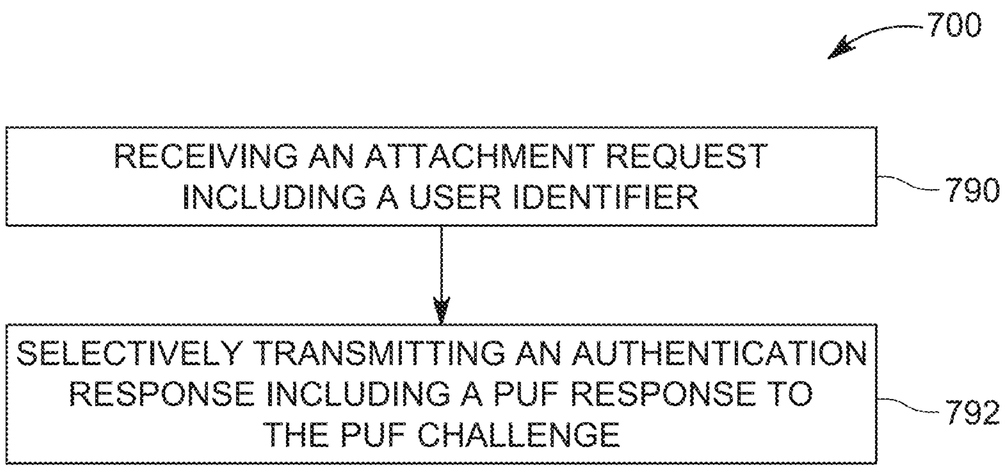
FIG. 7 is a flowchart of a method performed by a core network device in a cellular network according to an embodiment.

FIG. 7 is a flowchart of an authentication method 700 using a PUF response, the method being performed by a core network device (e.g., 450 in FIG. 4) in a cellular network according to an embodiment. The method 700 includes receiving 790 an attachment request including a user identifier. The method 700 further includes selectively transmitting 792 an authentication request including a PUF challenge associated with the user identifier. The step 792 may include verifying that the PUF challenge is included in a set of pre-registered PUF associated with the user identifier.

The methods 500, 600, and 700 and various other embodiments including the steps of these methods may be implemented in an LTE or a 5G cellular network.

Figure 8:
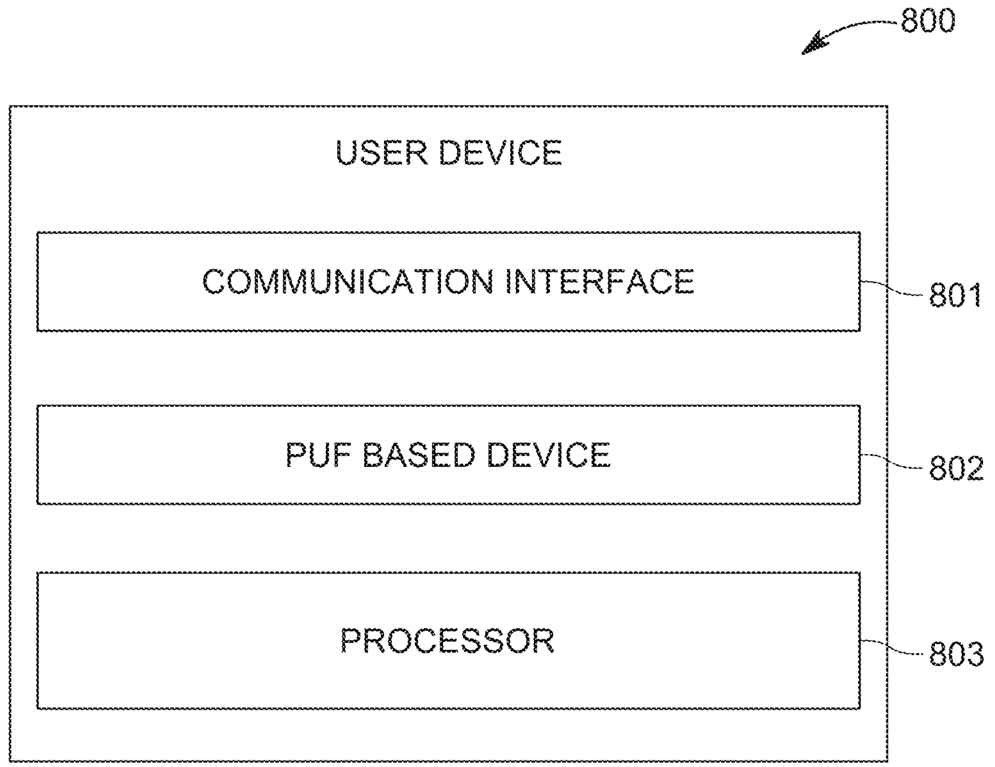
FIG. 8 is a block diagram illustrating a user device operating in a cellular network according to an embodiment.

FIG. 8 is a block diagram illustrating a user device 800 (which may be UE 310 or 410 operating in a cellular network according to an embodiment. The user device 800 includes a communication interface 801 configured to exchange wireless communications with devices in the cellular network, a PUF based device 802 (e.g., USIM module) configured to output unique PUF responses to PUF challenges, respectively, and a processor 803 configured to control the communication interface and the PUF to perform the steps of the method 500.

Figure 9:
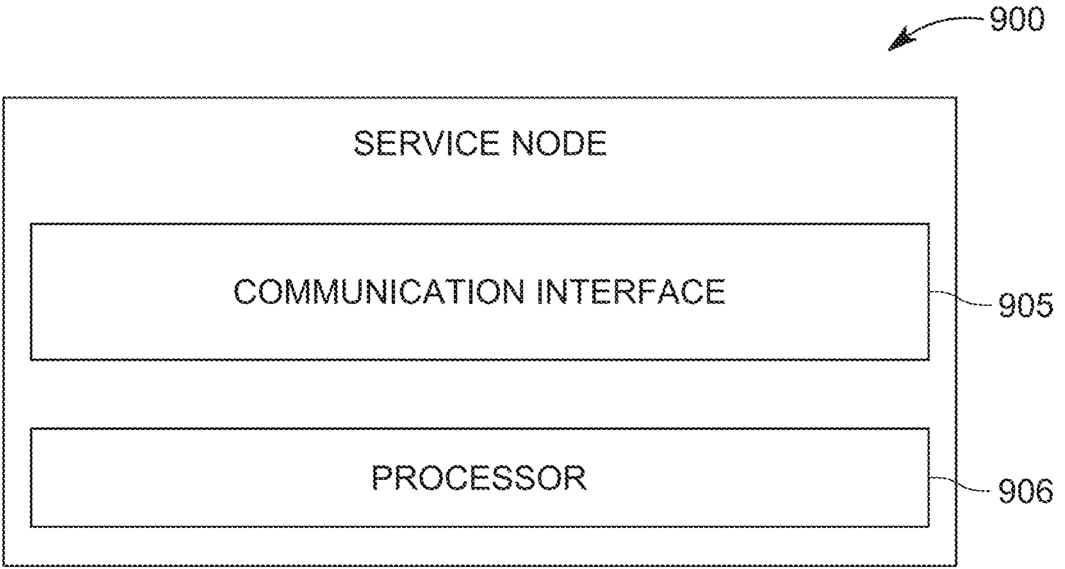
FIG. 9 is a block diagram of a service node in a cellular network according to an embodiment.

FIG. 9 is a block diagram of a service node 900 intermediating cellular services between a core network and a user device, in a geographic area according to an embodiment. The service node 900 includes a communication interface 905 configured to exchange wireless communications with user devices in the geographic area and core network devices in a cellular network, and a processor 906 configured to control the communication interface to perform the steps of method 600.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The term "about" is used in this application to mean a variation of up to 20% of the parameter characterized by this term. It will be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

The disclosed embodiments provide methods and systems for authentication to a network based on PUF responses. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The entire content of the following publications is incorporated by reference in this patent application:

[1] CN Patent Application No. 201610282695.6A (published as CN 105978694B);

[2] U.S. patent Ser. No. 15/883,092 (published as U.S. Pat. No. 10,708,780 B2); and

[3] PCT Application Serial No. PCT/US2017/029436 (published as WP 2017/189590 A1).

What is claimed is:

1. A user authentication method performed by a user equipment, UE, in a cellular network, the method comprising:

transmitting, to a serving node, SN, an attachment request including a user identifier;

receiving, from the SN, an authentication request including a result of a hash function applied to (1) a physical unclonable function, PUF, challenge, (2) a first random number, and (3) a serving node identifier of the SN;

verifying, by the UE, that the first random number has not been previously exchanged with the SN;

conditioned upon successful verification of the first random number, measuring a PUF response by applying the PUF challenge to a physical variation of a universal subscriber identity module, USIM, of the UE; and selectively transmitting an authentication response including the measured PUF response and a second random number generated by the UE, wherein the authentication response is cryptographically bound to the PUF challenge and the serving node identifier via a second hash result, wherein the selectively transmitting includes verifying that the PUF challenge associated with the authentication request is included in a set of PUF challenges registered with the cellular network.

2. The user authentication method of claim 1, wherein the UE receives the authentication request from the SN, and the selectively transmitting includes verifying that the first random number has not been previously exchanged with the SN, otherwise the UE declining the authentication request.

3. The user authentication method of claim 2, wherein the selectively transmitting includes verifying that a received user identifier indicated via the authentication request corresponds to the user identifier included in the attachment request, otherwise the UE declining the authentication request.

4. The user authentication method of claim 1, wherein the authentication response includes a result of the hash function applied to the PUF challenge, a second random number, and the serving node identifier.

5. The user authentication method of claim 1, wherein the user identifier is a temporary identifier.

6. The user authentication method of claim 1, further comprising:

registering, with the cellular network, the set of PUF challenges and a set of PUF responses generated by the USIM of the user device in response to the set of PUF challenges.

7. The user authentication method of claim 1, wherein the cellular network is a Long Term Evolution, LTE, cellular network or a fifth generation, 5G, cellular network.

8. An authentication method performed by a serving node in a cellular network, the method comprising:

forwarding an attachment request including a user identifier, ID, to a core network device;

generating an authentication request including a result of a hash function applied to:

(1) a physical unclonable function, PUF, challenge received from the core network device in response to the attachment request, (2) a first random number generated by the serving node, and (3) a serving node identifier of the serving node; and transmitting the authentication request, after verifying that the PUF challenge associated with the authentication request is included in a set of PUF challenges registered with the cellular network, to a user equipment, UE, associated with the user ID;

receiving, from the UE, an authentication response including a second random number and a measured PUF response, wherein the authentication response is cryptographically bound to the PUF challenge and the serving node identifier via a second hash result; and verifying the authentication response by checking the second random number and confirming that the measured PUF response corresponds to the transmitted PUF challenge, wherein the PUF response is a result of applying the PUF challenge to a physical hardware variation of a universal subscriber identity module, USIM, of the UE.

9. The method of claim 8, wherein the selectively transmitting the authentication request includes verifying that a returned user ID received with the PUF challenge matches a user ID stored by the serving node.

10. The method of claim 8, wherein verifying that the PUF response associated with the authentication response corresponds to the stored PUF challenge includes:

transmitting the PUF response to the core network device; and in response to transmitting the PUF response, receiving an indication that the PUF response is included in a set of pre-registered PUF responses associated with the UE.

11. The method of claim 8, further comprising:

sending, to the core network device, an indication that the UE is not authenticated when the verifying determines that the PUF response associated with the authentication response received from the UE does not correspond to the PUF challenge.

12. The method of claim 8, wherein the authentication response includes a result of applying the hash function to the PUF challenge, a second random number, and the serving node ID.

13. The method of claim 8, wherein the cellular network is a Long Term Evolution, LTE, cellular network or a fifth generation, 5G, cellular network.

14. A user device configured to operate in a cellular network, the user device comprising:

a communication interface configured to exchange wireless communications with a serving node in the cellular network;

a physical unclonable function, PUF, defined by intrinsic physical hardware variations of a universal subscriber identity module (USIM) of the user device, the PUF configured to output unique PUF responses in response to applied PUF challenges; and a processor configured to control the communication interface and the PUF to:

transmit an attachment request including a user identifier;

receive an authentication request including a result of a hash function applied to (1) a specific PUF challenge, (2) a first random number, and (3) a serving node identifier;

verify that the first random number has not been previously exchanged with the serving node; and conditioned upon successful verification of the first random number, selectively transmit an authentication response, including a PUF response to the specific PUF challenge and a second random number generated by the processor, wherein the authentication response is cryptographically bound to the specific PUF challenge and the serving node identifier via a second hash result, wherein the selectively transmit includes verifying that the PUF challenge associated with the authentication request is included in a set of PUF challenges registered with the cellular network.

15. The user device of claim 14, wherein the processor is configured to apply the hash function to a second random number, the serving node identifier, and the specific PUF challenge to generate the authentication response.

16. The user device of claim 15, wherein the second random number is generated by the processor.

* * * * *